(12) United States Patent  
Mitsuhashi et al.

(10) Patent No.: US 8,684,575 B2  
(45) Date of Patent: Apr. 1, 2014

(54) LIGHTING UNIT

(75) Inventors: Yuki Mitsuhashi, Tokyo (JP); Toru Umeda, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 202 days.

(21) Appl. No.: 13/404,223

(22) Filed: Feb. 24, 2012

(65) Prior Publication Data

US 2012/0218772 A1 Aug. 30, 2012

(30) Foreign Application Priority Data

Feb. 24, 2011 (JP) ................................ 2011-038758  
Feb. 24, 2011 (JP) ................................ 2011-038759

(51) Int. Cl.  
*F21V 13/04* (2006.01)

(52) U.S. Cl.  
USPC ........... 362/516; 362/545; 362/612; 362/628; 362/308; 362/299

(58) Field of Classification Search  
USPC ................. 362/308, 516, 545, 612, 628, 299  
See application file for complete search history.

(56) References Cited

U.S. PATENT DOCUMENTS

| | | | |
|---|---|---|---|
| 6,679,621 B2 | 1/2004 | West et al. | |
| 7,059,731 B2 | 6/2006 | Lee et al. | |
| 7,290,906 B2 * | 11/2007 | Suzuki et al. | 362/511 |
| 7,322,729 B2 | 1/2008 | Nagabuchi | |
| 8,562,199 B2 * | 10/2013 | Okada | 362/628 |
| 2012/0188774 A1 * | 7/2012 | Okada | 362/299 |

FOREIGN PATENT DOCUMENTS

| | | |
|---|---|---|
| JP | 2003-317508 A | 11/2003 |
| JP | 2006-339121 A | 12/2006 |

* cited by examiner

*Primary Examiner* — Stephen F Husar  
*Assistant Examiner* — James Cranson, Jr.  
(74) *Attorney, Agent, or Firm* — Kenealy Vaidya LLP

(57) ABSTRACT

A lighting unit including a lens body can achieve luminous flux utilization efficiency equal to or greater than a conventional lighting unit even with a reduced width of the lens body. A vehicle lighting unit can be constituted by a plurality of the lighting units. The lighting unit can include an LED light source, and a lens body disposed in front of the LED light source so that light emitted from the LED light source can be incident thereon. The lens body can include a lens portion configured to receive the light from the LED light source to collect the light, a front surface including the lens portion, a rear surface opposite to the front surface, a first end surface functioning as a light exiting surface having a substantially rectangular shape greater in width than in thickness, and a second end surface opposite to the first end surface.

7 Claims, 14 Drawing Sheets

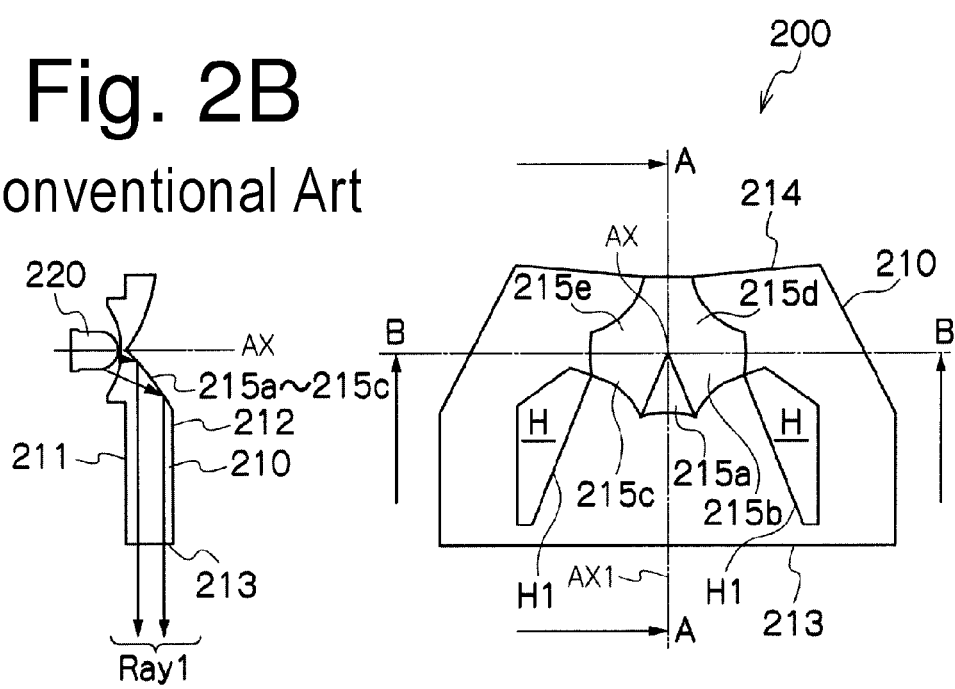
Fig. 2A Conventional Art
Fig. 2B Conventional Art
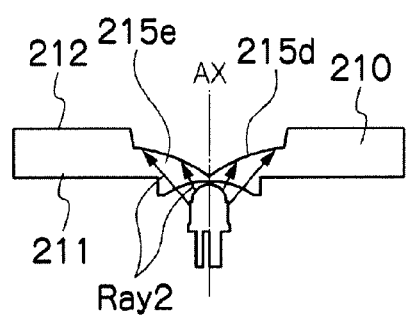
Fig. 2C Conventional Art

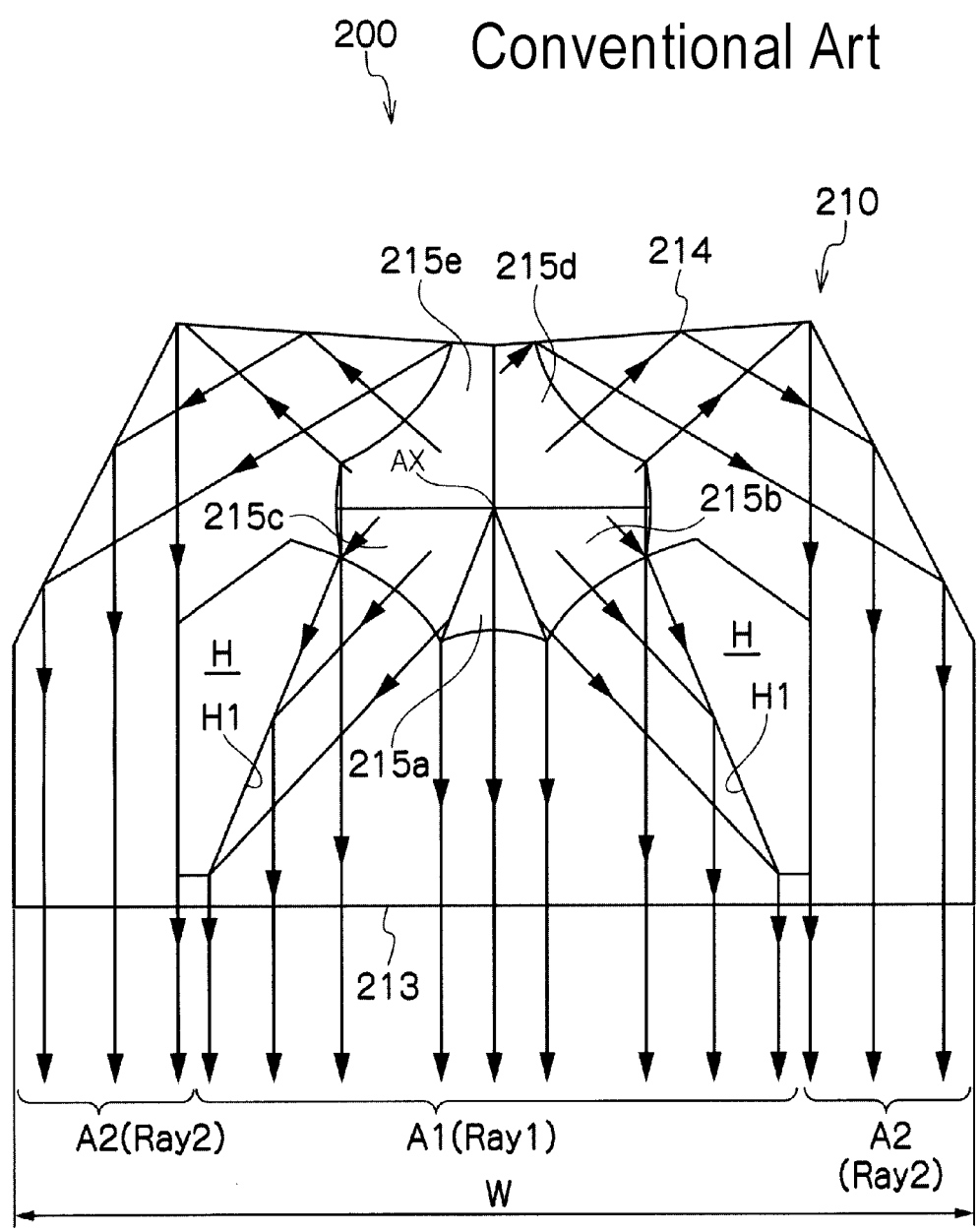

Comparative Example luminous flux utilization efficiency: 42.89%
luminous flux: 24.73 lm

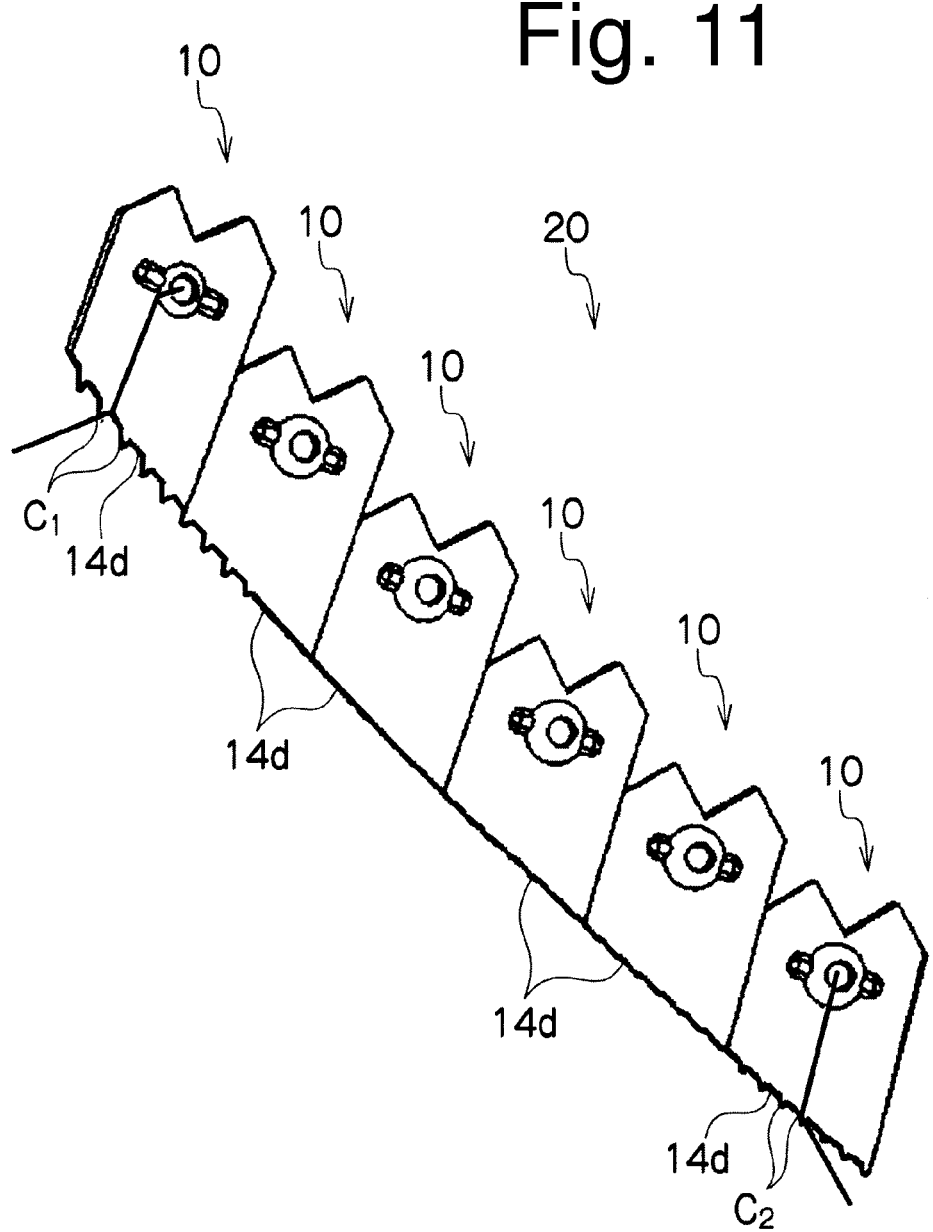

Fig. 12A
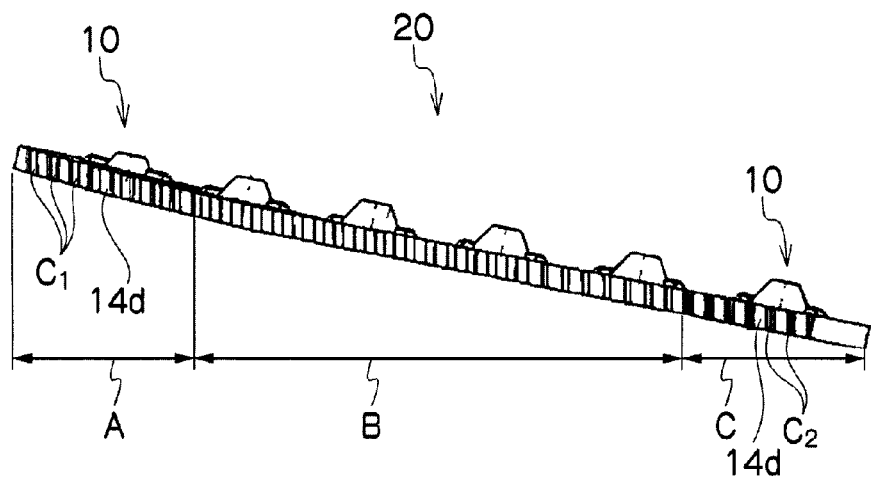
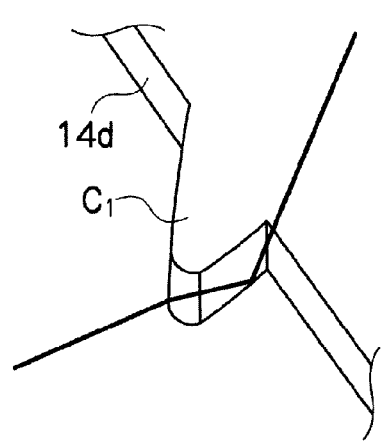
Fig. 12B
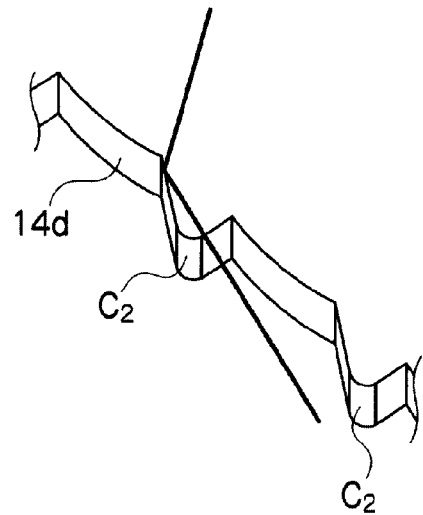
Fig. 12C

LIGHTING UNIT

This application claims the priority benefit under 35 U.S.C. §119 of Japanese Patent Applications Nos. 2011-038758 filed on Feb. 24, 2011 and 2011-038759 filed on Feb. 24, 2011, which are hereby incorporated in their entirety by reference.

TECHNICAL FIELD

The presently disclosed subject matter relates to a lighting unit and a vehicle lighting unit including a plurality of the lighting units. In particular, the presently disclosed subject matter relates to a lighting unit including an LED light source and a plate-like lens body used in combination, and to a vehicle lighting unit including a plurality of the lighting units.

BACKGROUND ART

A lighting unit including an LED light source and a plate-like lens body used in combination has conventionally been suggested (see, for example, Japanese Patent No. 4458359 (or U.S. Pat. No. 7,322,729 B2 corresponding thereto) which is referred to as patent literature 1 hereinafter).

As shown in FIGS. 1 to 3, a lighting unit 200 disclosed in Patent Literature 1 can include a plate-like lens body 210, and an LED light source 220 arranged to face the front surface of the lens body 210. The lens body 210 can be formed in a plate shape, and can have a front surface 211, a rear surface 212 opposite to the front surface 211, a first end surface 213 functioning as a light exiting surface having a substantially rectangular shape greater in width than in thickness, a second end surface 214 opposite to the first end surface 213, and total reflection surfaces 215a to 215e each arranged on an optical path of the rays of light emitted from the LED light source 220 and entering the lens body 210. As shown in FIG. 2A, the total reflection surfaces 215a to 215c are disposed between the optical axis AX of the LED light source 220 and the first end surface 213 so that part of rays of light Ray1 emitted from the LED light source 220 and entering the lens body 210 enters these surfaces 215a to 215c and travels between the optical axis AX of the LED light source 220 and the first end surface 213. As shown in FIG. 2C, the total reflection surfaces 215d and 215e are disposed between the optical axis AX of the LED light source 220 and the second end surface 214 so that part of rays of light Ray2 emitted from the LED light source 220 and entering the lens body 210 enters these surfaces 215d and 215e and travels between the optical axis AX of the LED light source 220 and the second end surface 214.

In the lighting unit 200 with the above configuration, as shown in FIG. 3, the part of rays of light Ray1 emitted from the LED light source 220 and entering the lens body 210 can travel between the optical axis AX of the LED light source 220 and the first end surface 213 and be totally reflected by the total reflection surfaces 215a to 215c, thereby exiting through the first end surface 213 (in particular, through the central region A1). Further, the part of rays of light Ray2 emitted from the LED light source 220 and entering the lens body 210 can travel between the optical axis AX of the LED light source 220 and the second end surface 214 and be totally reflected by the total reflection surfaces 215d and 215e, thereby exiting through the first end surface 213 (in particular, through the regions A2 adjacent to, and on both sides of, the central region A1). This configuration can allow the first end surface 213 (including the central region A1 and the adjacent regions A2) to form a linear light source for linearly emitting light.

However, the above lighting unit 200 should include a through hole H because the linear light emission should be achieved. Namely, with this configuration, the rays of light Ray1 can enter the total reflection surface 215b and 215c to be reflected therefrom to the wall surfaces H1 of the through holes H, and then can be reflected from the wall surfaces H1 toward the first end surface 213 (the central region A1), so as to exit from the first end surface 213 (the central region A1). This means that the portion to be formed into the through hole constituting the desired reflection surfaces should be ensured in the raw material lens body 210, and accordingly, the width W of the lens body 210 cannot be shortened by that amount. If the width W of the lens body 210 is simply shortened for compactness, the luminous flux exiting through the first end surface 213 may be reduced by that amount.

SUMMARY

The presently disclosed subject matter was devised in view of these and other problems and features and in association with the conventional art. According to an aspect of the presently disclosed subject matter, a lighting unit can achieve the luminous flux utilization efficiency equal to or more than the conventional lighting unit even with a reduced width of the lens body. A vehicle lighting unit can be constituted by a plurality of the lighting units.

According to another aspect of the presently disclosed subject matter, a lighting unit can include an LED light source having an optical axis, and a lens body disposed in front of the LED light source so that rays of light emitted from the LED light source can be incident thereon, the lens body including a lens portion configured to receive the rays of light from the LED light source to collect the rays of light, a first surface (or a front surface) including the lens portion, a second surface (or a rear surface) opposite to the first surface, a first end surface functioning as a light exiting surface having a substantially rectangular shape greater in width than in thickness, and a second end surface opposite to the first end surface.

The lens body can include a first total reflection surface disposed between the optical axis of the LED light source and the first end surface so as to receive part of rays of light that has entered the lens body from the lens portion and travels between the optical axis of the LED light source and the first end surface. A second total reflection surface can be disposed between the optical axis of the LED light source and the second end surface so as to receive part of rays of light that has entered the lens body from the lens portion and travels between the optical axis of the LED light source and the second end surface, the second total reflection surface including a first reflection region disposed on a first side with respect to an optical axis of the lighting unit and a second reflection region disposed on a second side with respect to the optical axis. The first total reflection surface can directly totally reflect part of the rays of light, which has entered the lens body from the lens portion and impinges on the first total reflection surface, to a central region of the first end surface so that the part of the rays of light exits as rays of light substantially parallel to the optical axis of the lighting unit through the central region. The second total reflection surface can totally reflect part of the rays of light, which has entered the lens body from the lens portion and impinges on the second total reflection surface, to the second end surface. The second end surface can include a first inner end surface disposed on the first side with respect to an optical axis of the lighting unit (that is perpendicular to the optical axis of the light source) and a first outer end surface disposed on the outer side of the first inner end surface, and a second inner end surface disposed on the second side with respect to the optical axis of the lighting unit and a second outer end surface disposed on the outer side of the second inner end surface. The first inner end surface can totally reflect the rays of light from the first reflection region to the first outer end surface. The first outer end surface can directly totally reflect the rays of light from the first inner end surface to a first adjacent region adjacent to the central region of the first end surface on the first side so that the rays of light exit as rays of light substantially parallel (i.e., parallel or almost parallel) to the optical axis of the lighting unit through the first adjacent region. The second inner end surface can totally reflect the rays of light from the second reflection region to the second outer end surface. The second outer end surface can directly totally reflect the rays of light from the second inner end surface to a second adjacent region adjacent to the central region of the first end surface on the second side so that the rays of light exit as rays of light parallel or substantially parallel to the optical axis of the lighting unit through the second adjacent region. The first total reflection surface can include a first end edge and a second end edge opposite to the first end edge in a width direction (perpendicular to the optical axis of the lighting unit) of the lens body, the first end edge extending substantially to (i.e., to or near) a line parallel to the optical axis of the lighting unit and extending from a boundary between the first inner end surface and the first outer end surface, the second end edge extending substantially to a line parallel to the optical axis of the lighting unit and extending from a boundary between the second inner end surface and the second outer end surface.

With this configuration, the first total reflection surface can totally reflect the rays of light entering the first total reflection surface directly to the central region of the first end surface so that the rays of light can exit through the central region of the first end surface. Namely, it is not necessary to form a through hole(s) which has been provided to the conventional lighting unit. By eliminating the unnecessary portion for forming the through hole, the width dimension of the lens body can be reduced.

Also, with this configuration, the first end edge of the first total reflection surface in the width direction (perpendicular to the optical axis direction of the lighting unit) of the lens body can extend substantially to the line parallel to the optical axis and extending from the boundary between the first inner end surface and the first outer end surface, and the second end edge of the first total reflection surface in the width direction of the lens body can extend substantially to the line parallel to the optical axis and extending from the boundary between the second inner end surface and the second outer end surface. Namely, the first total reflection surface can have a certain width. Accordingly, the lighting unit can achieve the luminous flux utilization efficiency equal to or more than the conventional lighting unit even with the reduced width of the lens body.

With the above configuration, while the luminous flux utilization efficiency equal to or more than that of the conventional lighting unit can be achieved, the width dimension of the lens body can be reduced to a greater degree than the conventional lighting unit. Accordingly, it is possible to provide a compact lighting unit with improved freedom of layout due to the reduced width compared with the conventional lighting unit.

In the lighting unit with the above configuration, the first inner end surface, the first outer end surface, the second inner end surface, and the second outer end surface can be configured to be inclined according to a draft angle of a mold for use in injection molding of the lens body. The first reflection region and the second reflection region can be configured such that the rays of light totally reflected by the first inner end surface and the first outer end surface and the rays of light totally reflected by the second inner end surface and the second outer end surface cannot be reflected by the second surface (or the rear surface) of the lens body, but can directly exit through the first end surface.

With this configuration, the rays of light totally reflected by the first inner end surface and the first outer end surface (also the rays of light totally reflected by the second inner end surface and the second outer end surface) cannot be reflected by the second surface of the lens body, but can travel and directly exit through the first end surface (adjacent regions). Accordingly, the lighting unit with high luminous flux utilization efficiency can be achieved.

In the lighting unit with the above configuration, the first end surface can be provided with a lens cut for illuminating a desired area in a desired direction with the rays of light exiting through the first end surface.

With this configuration, the lighting unit can illuminate the desired area in the desired direction (for example, a sideward area in a direction of 45 degrees, or 80 degrees) with the rays of light emitted from the first end surface.

According to still another aspect of the presently disclosed subject matter, a vehicle lighting unit can include a plurality of the lighting units with the above configuration with the first end surfaces of the plurality of lighting units being arranged side by side along a line extending from a front portion of a vehicle body to a side portion of the vehicle body, so that a continuous linear light exiting surface from the front portion of the vehicle body to the side portion can be configured. At least one of the first end surfaces of the plurality of lighting units arranged near the side portion of the vehicle body can have a first lens cut for illuminating a first region in a first direction with the rays of light exiting through that first end surface. At least one of the first end surfaces of the plurality of lighting units arranged near the front portion of the vehicle body can have a second lens cut for illuminating a second region in a second direction with the rays of light exiting through that first end surface.

In the vehicle lighting unit with the above configuration, the action of the first lens cut and that of the second lens cut can provide appropriate light illumination in the first direction (for example, inner 45 degrees with respect to the vehicle travelling direction) and in the second direction (for example, outer 80 degrees with respect to the vehicle travelling direction) where a certain luminance is required, as in a positioning lamp.

In the vehicle lighting unit with the above configuration, at least one connection portion can be interposed between any two adjacent ones of the first end surfaces of the plurality of lighting units arranged side by side along the line extending from the front portion of the vehicle body to the side portion of the vehicle body so that a continuous linear light exiting surface from the front portion of the vehicle body to the side portion can be configured. At least one second end surface out of the second end surfaces of the plurality of lighting units can be adjusted so that at least part of the rays of light totally reflected by the second end surface can pass through the connection portion.

With this configuration, the part of the rays of light totally reflected by the adjusted second end surface can pass through the connection portion so that the connection portion can project the rays of light. Accordingly, the first end surfaces and the connection portion continuously arranged can project the rays of light without disconnection as a single linear vehicle lighting unit.

Accordingly, it is possible to provide a lighting unit that can achieve the luminous flux utilization efficiency equal to or more than the conventional lighting unit even with the reduced width of the lens body as well as a vehicle lighting unit that can be constituted by a plurality of the lighting units.

BRIEF DESCRIPTION OF DRAWINGS

These and other characteristics, features, and advantages of the presently disclosed subject matter will become clear from the following description with reference to the accompanying drawings, wherein:

FIG. 2A is a top plan view of the conventional lighting unit, FIG. 2B is a cross-sectional view taken along line A-A of FIG. 2A, and FIG. 2C is a cross-sectional view taken along line B-B of FIG. 2A;

FIG. 3 is a diagram illustrating the optical paths of rays of light emitted from the LED light source in the conventional lighting unit of FIG. 1;

FIG. 11 is a diagram of the vehicle lighting unit of FIG. 10 when viewed from the front surface side;

FIG. 12A is a front view of the vehicle lighting unit of FIG. 10, FIG. 12B is a perspective view of a first lens cut of the vehicle lighting unit, and FIG. 12C is a second lens cut of the vehicle lighting unit;

DESCRIPTION OF EXEMPLARY EMBODIMENTS

A description will now be made below to lighting units of the presently disclosed subject matter with reference to the accompanying drawings in accordance with exemplary embodiments.

The lighting unit 10 of the exemplary embodiment can be applied to a vehicle-mounted signal lamp and to a general purpose illumination lamp. Examples of such a vehicle-mounted signal lamp include a rear position lamp, a stop lamp, a turn signal lamp, a daytime running lamp, and a position lamp.

As shown in FIGS. 4, 5, 6A, and 6B and other figures, the lighting unit 10 can include a light source 12, a lens body 14, and other structures.

The light source 12 can be an LED light source such as a white LED light source including at least one LED chip (a blue LED chip, for example) and a fluorescent substance (yellow fluorescent substance, for example).

Figure 1:
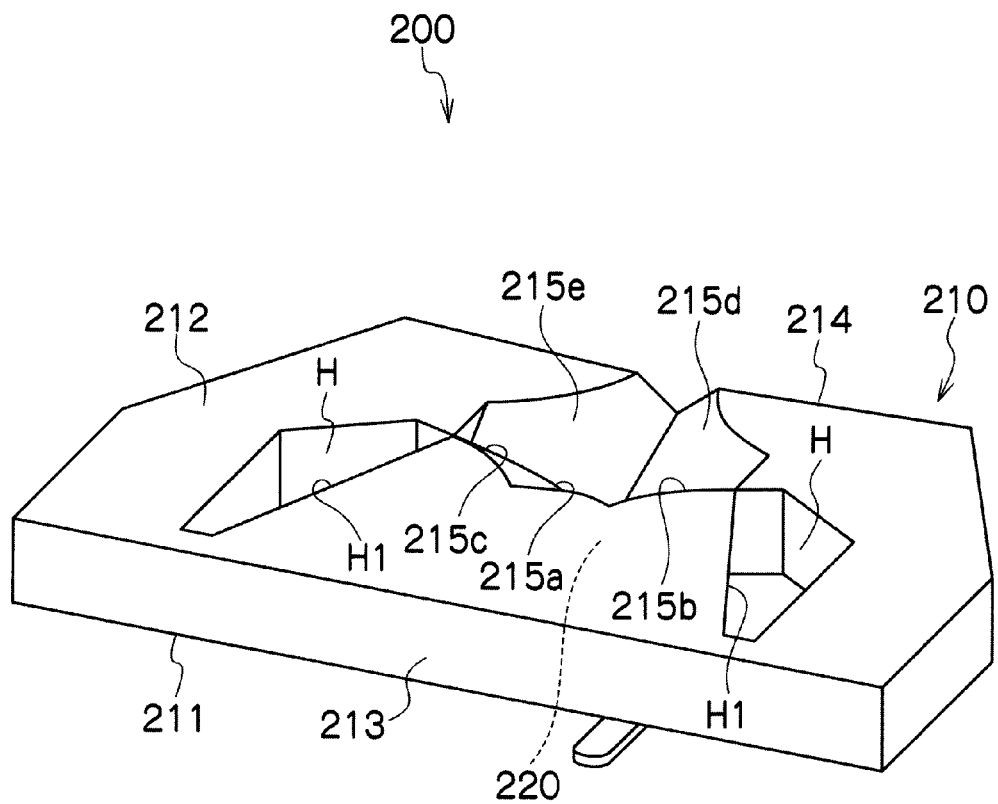
FIG. 1 is a perspective view of a conventional lighting unit.
Figure 4:
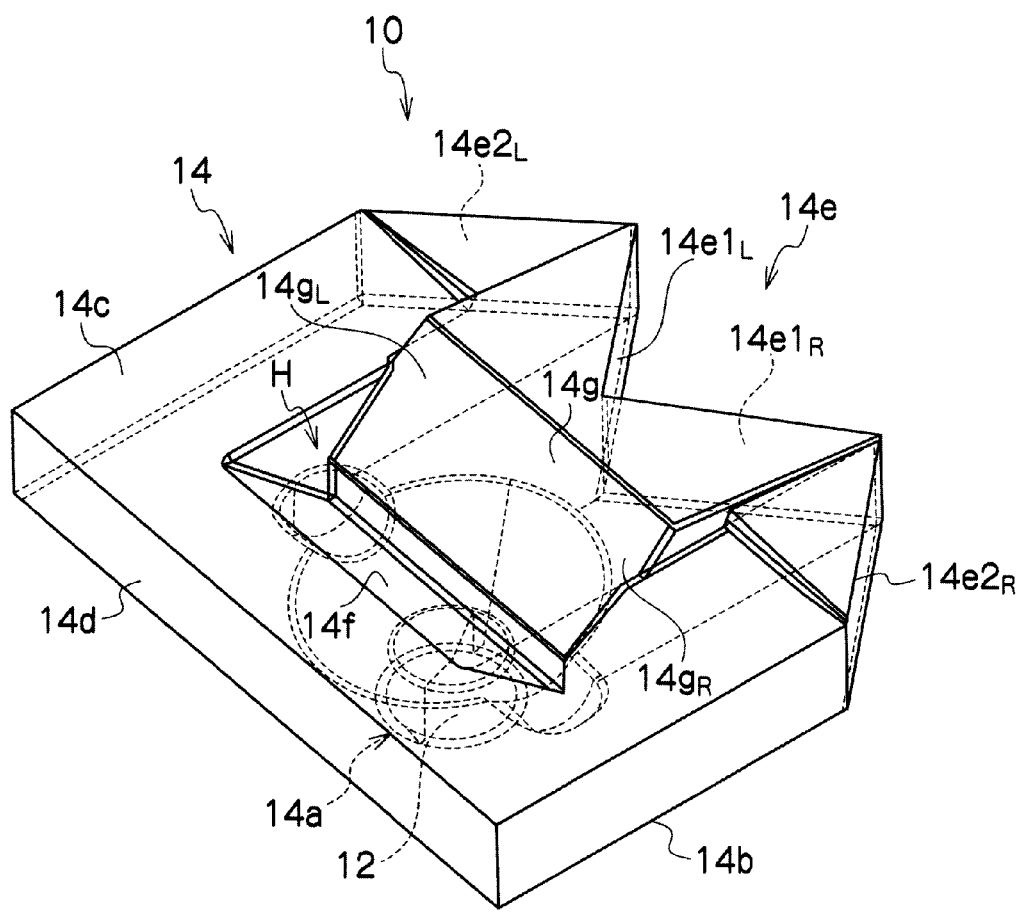
FIG. 4 is a perspective view of a lighting unit made in accordance with principles of the presently disclosed subject matter.
Figure 5:
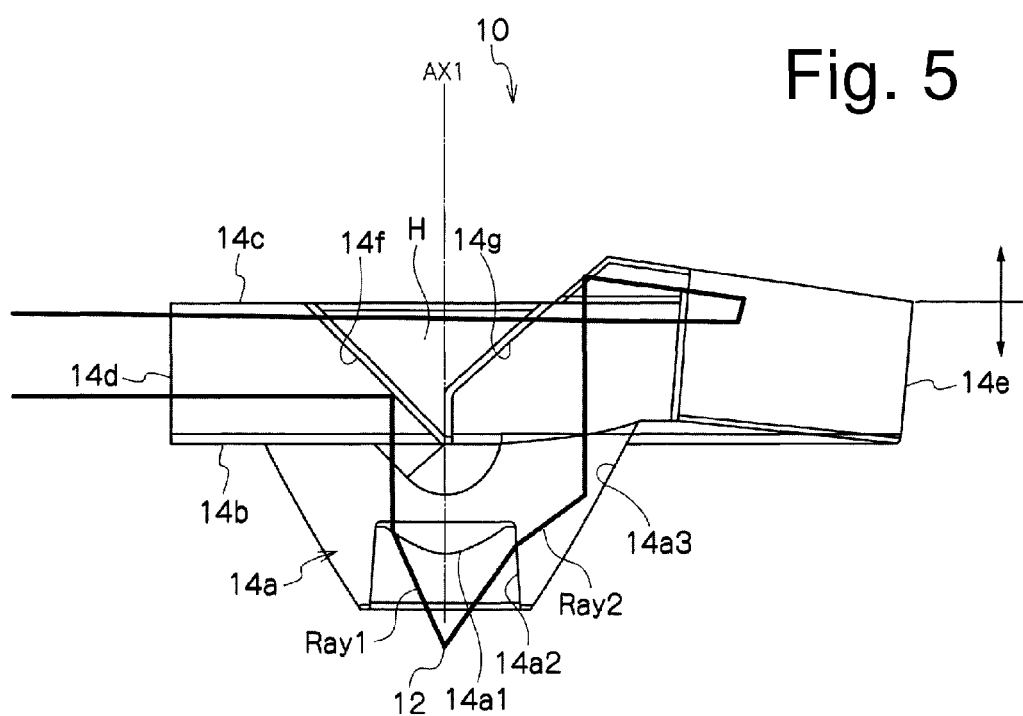
FIG. 5 is a cross-sectional view of the lighting unit of FIG. 4.

As shown in FIGS. 4 and 5, the lens body 14 can be a lens body in a plate shape, disposed in front of the LED light source 12 so that rays of light emitted from the LED light source 12 can be incident thereon. The lens body 14 can be configured to include a lens portion 14a configured to receive the rays of light from the LED light source 12 to collect the light, a first surface 14b (or a front surface) including the lens portion 14a, a second surface 14c (or a rear surface) opposite to the first surface 14b, a first end surface 14d functioning as a light exiting surface having a substantially rectangular shape greater in width (for example, 40 mm) than in thickness (for example, 6 mm), a second end surface 14e opposite to the first end surface 14d, and a first total reflection surface and a second total reflection surface disposed on optical paths of the rays of light entering the lens body 14 through the lens portion 14a.

The lens body 14 can be made of a transparent resin such as an acrylic resin or polycarbonate resin, for example. It should be noted that the second end surface 14e can be inclined due to the draft angle (approx. 3 degrees) of the mold for use in the injection molding of the lens body 14 (see FIG. 5). FIG. 5 includes the vertical arrows on the right side indicating the directions of the releasing of the mold. In the present exemplary embodiment, the lens body 14 has a concave portion H formed in the second surface (rear surface) 14c of the lens body 14 whose surfaces can function as the first total reflection surface 14f and the second total reflection surface 14g.

The lens portion 14a is a lens portion configured to receive the rays of light from the LED light source 12 to collect the rays of light, whereby the rays of light can enter the lens body 14. The lens portion 14a can be configured to include a first light incident surface 14a1 that can be disposed in front of the LED light source 12 and can cause the rays of light emitted from the LED light source 12 in a narrow angle direction with respect to the optical axis AX1 of the lens portion 14a (for example, rays of light Ray1 in FIG. 5) to be incident thereon; a second light incident surface 14a2 that can be disposed in front of the LED light source 12 and can cause the rays of light emitted from the LED light source 12 in a wide angle direction with respect to the optical axis AX1 of the lens portion 14a (for example, rays of light Ray2 in FIG. 5) to be incident thereon; and a total reflection surface 14a3 disposed outside of the second light incident surface 14a2 so that the rays of light entering the lens body 14 through the second light incident surface 14a2 while being refracted thereby can be incident on the total reflection surface 14a3.

The first light incident surface 14a1 can be a lens surface that can collect the rays of light emitted from the LED light source 12 in the narrow angle direction with respect to the optical axis AX1 of the lens portion 14a so as to be closer to the optical axis AX1 (for example, substantially parallel with the optical axis AX1) so that the rays of light can enter the lens body 14. For example, the first light incident surface 14a1 can be composed of a convex lens surface.

The second light incident surface 14a2 can be a lens surface that can cause the rays of light emitted from the LED light source 12 in the wide angle direction with respect to the optical axis AX1 to enter the lens body 14. For example, the second light incident surface 14a2 can be composed of a cylindrical lens surface extending from the periphery of the first light incident surface 14a1 to the side of the LED light source 12.

The total reflection surface 14a3 can be configured so that the rays of light entering the lens body 14 through the second light incident surface 14a2 while being refracted thereby can be collected closer to the optical axis AX1 (for example, substantially parallel with the optical axis AX1). The total reflection surface 14a3 can be composed of a total reflection surface formed by a revolved paraboloid. For example, the revolved paraboloid can be formed by rotating a parabola around the optical axis AX1 as a rotary axis, with the parabola having a focal point at or near (substantially at) an intersection of extending lines of rays of light (not shown) refracted by the second light incident surface 14a2 and entering the lens body 14.

The lens portion 14a with the above configuration can provide an action wherein the rays of light emitted from the LED light source 13 (for example, Ray1 and Ray2 in FIG. 5) can be converted to substantially parallel (i.e., parallel or almost parallel) rays of light to the optical axis AX1 to enter the lens body 14.

Figure 6A:
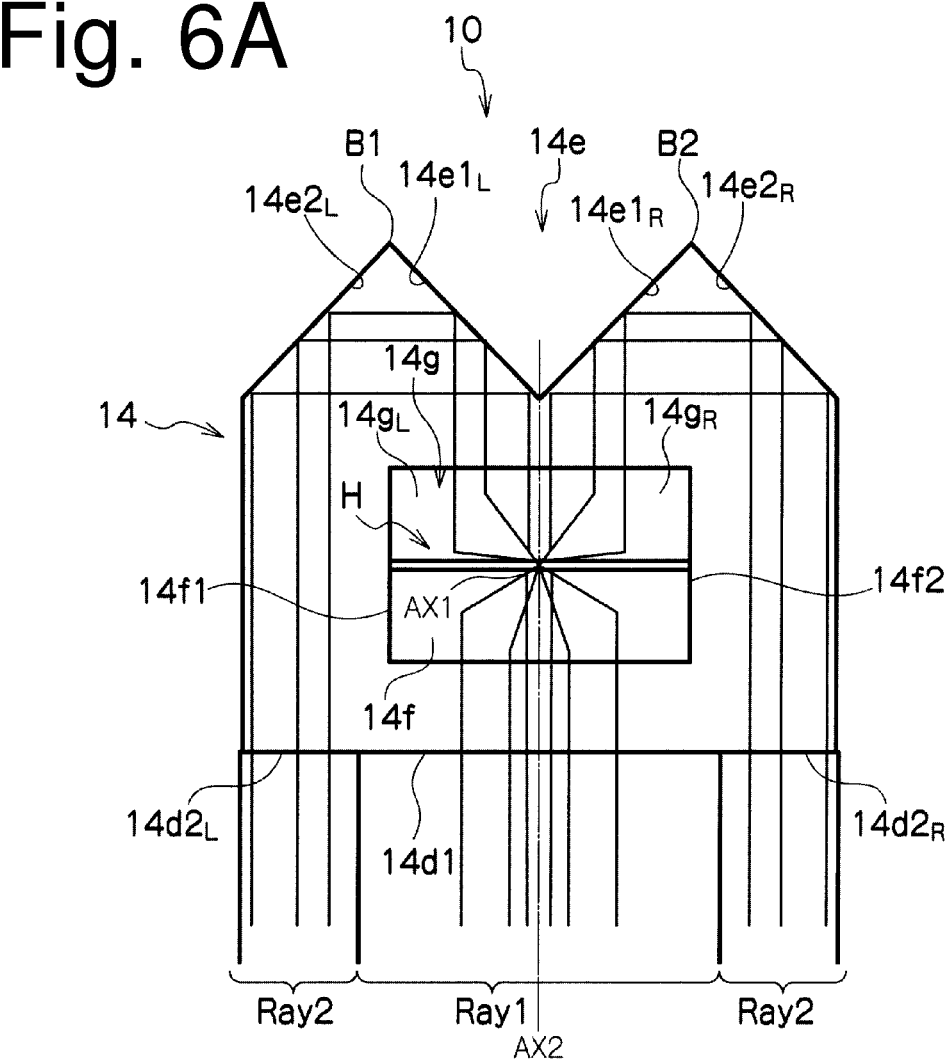
FIG. 6A is a top plan view of the lighting unit of FIG. 4.

As shown in FIGS. 5 and 6A, the first total reflection surface 14f can be disposed between the optical axis AX1 of the LED light source 12 and the first end surface 14d so that part of rays of light entering the lens body 14 through the lens portion 14a, i.e., the rays of light Ray1, travelling between the optical axis AX1 and the first end surface 14d can impinge on the first total reflection surface 14f.

The first total reflection surface 14f can be a total reflection surface that can directly totally reflect the part of rays of light entering the lens body 14 through the lens portion 14a and impinging on the first total reflection surface 14f to the central region 14d1 of the first end surface 14d (see FIG. 6A) so that the substantially parallel (parallel or almost parallel) rays of light to the optical axis AX2 can exit through the central region 14d1. For example, the first total reflection surface 14f can be a planar total reflection surface inclined toward the first end surface 14d (for example, by 45 degrees).

The second total reflection surface 14g can be disposed between the optical axis AX1 of the LED light source 12 and the second end surface 14e so that part of rays of light entering the lens body 14 through the lens portion 14a, i.e., the rays of light Ray2, travelling between the optical axis AX1 and the second end surface 14e can impinge on the second total reflection surface 14g.

The second total reflection surface 14g can be a total reflection surface that can totally reflect the part of rays of light entering the lens body 14 through the lens portion 14a and impinging on the second total reflection surface 14g to the second end surface 14e. For example, the second total reflection surface 14g can be a planar total reflection surface inclined toward the second end surface 14e (for example, by 45 degrees). Furthermore, the second total reflection surface 14g can include a first reflection region $14g_R$ disposed on a first side with respect to the optical axis AX2 of the lighting unit (right side in FIG. 6A) and a second reflection region $14g_L$ disposed on a second side with respect to the optical axis AX2 (left side in FIG. 6A).

As shown in FIG. 6A, the second end surface 14e can include a first inner end surface $14e1_R$ disposed on the first side with respect to the optical axis AX2 of the lighting unit (right side in FIG. 6A) and a first outer end surface $14e2_R$ disposed on the outer side of the first inner end surface $14e1_R$, and a second inner end surface $14e1_L$ disposed on the second side with respect to the optical axis (left side in FIG. 6A) and a second outer end surface $14e2_L$ disposed on the outer side of the second inner end surface $14e1_L$.

The first inner end surface $14e1_R$ can be a total reflection surface so as to totally reflect the rays of light Ray2 from the first reflection region $14g_R$ to the first outer end surface $14e2_R$. For example, the first inner end surface $14e1_R$ can be a planar total reflection surface inclined toward the first outer end surface $14e2_R$ (for example, by 45 degrees).

The first outer end surface $14e2_R$ can be a total reflection surface so as to directly totally reflect the rays of light from the first inner end surface $14e1_R$ to a first adjacent region $14d2_R$ adjacent to the central region 14d1 of the first end surface 14d on the first side (right side in FIG. 6A) so that the rays of light exit as rays of light parallel or substantially parallel to the optical axis AX2 of the lighting unit through the first adjacent region $14d2_R$. For example, the first outer end surface $14e2_R$ can be a planar total reflection surface inclined toward the first inner end surface $14e1_R$ (for example, by 45 degrees).

The second inner end surface $14e1_L$ can be a total reflection surface so as to totally reflect the rays of light Ray 2 from the second reflection region $14g_L$ to the second outer end surface $14e2_L$. For example, the second inner end surface $14e1_L$ can be a planar total reflection surface inclined toward the second outer end surface $14e2_L$ (for example, by 45 degrees).

The second outer end surface $14e2_L$ can be a total reflection surface so as to directly totally reflect the rays of light from the second inner end surface $14e1_L$ to a second adjacent region $14d2_L$ adjacent to the central region 14d1 of the first end surface 14d on the second side (left side in FIG. 6A) so that the rays of light exit as rays of light parallel or substantially parallel to the optical axis AX2 of the lighting unit through the second adjacent region $14d2_L$.

For example, the second outer end surface $14e2_L$ can be a planar total reflection surface inclined toward the second inner end surface $14e1_L$ (for example, by 45 degrees).

The first total reflection surface 14f can include a first end edge 14f1 and a second end edge 14f2 opposite to the first end edge 14f1 in the width direction (perpendicular to the optical axis AX2 of the lighting unit) of the lens body 14. The first end edge 14f1 can extend to or near a line parallel to the optical axis AX2 and extending from a boundary between the first inner end surface $14e1_R$ and the first outer end surface $14e2_R$ (near an apex B1 of the triangle in FIG. 6A). The second end edge 14f2 can extend to or near a line parallel to the optical axis AX2 and extending from a boundary between the second inner end surface $14e1_L$ and the second outer end surface $14e2_L$ (near an apex B2 of the triangle in FIG. 6A). Accordingly, the total reflection surface can be configured to have a larger width than a width of the conventional lighting unit.

In the lighting device 10 with the above configuration, as shown in FIG. 5, the part of rays of light Ray1 entering the lens body 14 through the lens portion 14a and travelling between the optical axis AX1 of the LED light source 12 and the first end surface 14d can be directly totally reflected by the action of the first total reflection surface 14f to the central region 14d1 of the first end surface 14d (see FIG. 6A) and can exit through the central region 14d1 as the substantially parallel (parallel or almost parallel) rays of light Ray1 to the optical axis AX2.

Further, the part of rays Ray2 of light entering the lens body 14 through the lens portion 14a and travelling between the optical axis AX1 of the LED light source 12 and the second end surface 14e can be totally reflected by the action of the second total reflection surface 14g (the first reflection region $14g_R$ and the second reflection region $14g_L$) and the second end surface 14e (the first inner end surface $14e1_R$, the first outer end surface $14e2_R$, the second inner end surface $14e1_L$, and the second outer end surface $14e2_L$) to the first and second adjacent regions $14d2_R$ and $14d2_L$ adjacent to the central region 14d1 of the first end surface 14d (see FIG. 6A) and can exit through the first and second adjacent regions $14d2_R$ and $14d2_L$ as the parallel or substantially parallel rays of light Ray2 to the optical axis AX2.

Figure 6B:
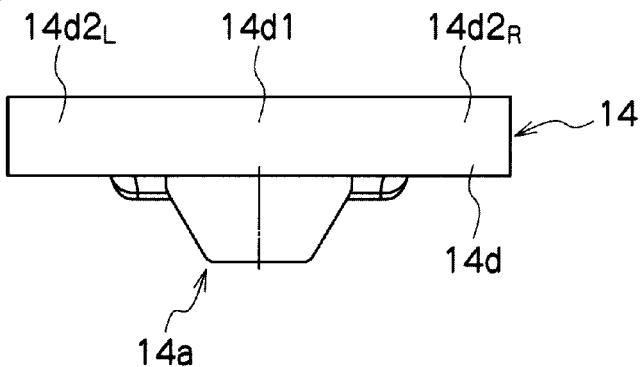
FIG. 6B is a front view thereof.

In this manner, the linear light source can be configured by the linear light emission from the first end surface 14*d* (including the central region 14*d*1 and the first and second adjacent regions 14*d*2$_R$ and 14*d*2$_L$, see FIG. 6B).

In the meantime, as shown in FIG. 5, the second end surface 14*e* (the first inner end surface 14*e*1$_R$, the first outer end surface 14*e*2$_R$, the second inner end surface 14*e*1$_L$, and the second outer end surface 14*e*2$_L$) can be inclined due to the draft angle of the mold for injection molding (approx. 3 degrees).

Figure 7:
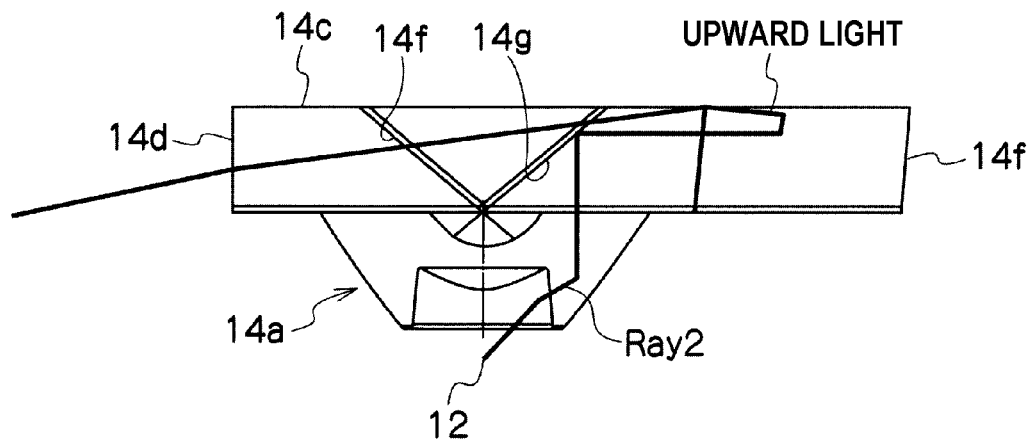
FIG. 7 is a diagram illustrating problems due to the inclination of the second end surface based on a draft of a mold for injection molding (approx. 3 degrees) (Comparative Example)
Figure 8:
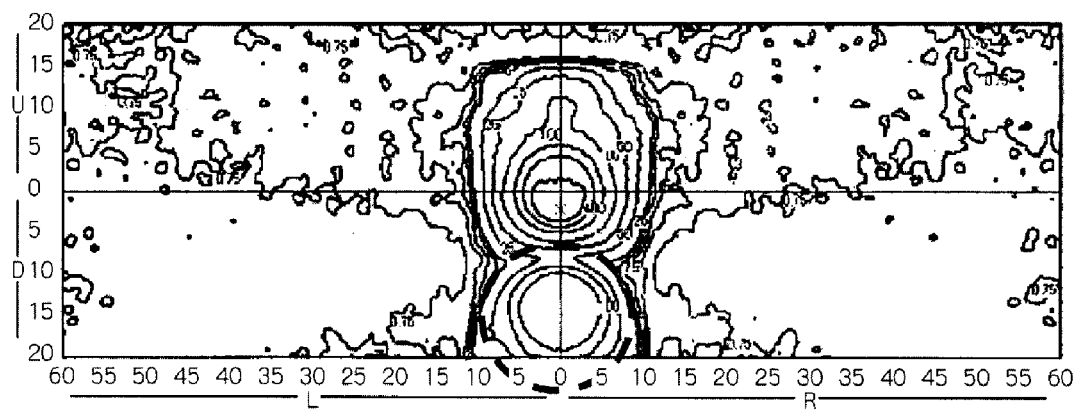
FIG. 8 is a diagram illustrating a light distribution formed by the rays of light projected from the lighting unit of FIG. 7 (Comparative Example)

With reference to FIG. 7, the rays of light Ray2 totally reflected by the second total reflection surface 14*g* (the first reflection region 14*g*$_R$ and the second reflection region 14*g*$_L$) and then by the second end surface 14*e* (the first inner end surface 14*e*1$_R$, the first outer end surface 14*e*2$_R$, the second inner end surface 14*e*1$_L$, and the second outer end surface 14*e*2$_L$) can become upward rays of light (approx. 6 degrees upwardly). Part of the upward rays of light can impinge on the rear surface 14*c* to be reflected thereby to the first end face 14*d* (the first and second adjacent regions 14*d*2$_R$ and 14*d*2$_L$) to become downward rays of light. The downward rays of light can be projected to a certain area where a certain luminance is not required in a light distribution pattern (such as for a daytime traveling lamp). This region is illustrated in FIG. 8 by dashed circular line (lower portion at the center thereof). Accordingly, this case may have a problem in that a luminous flux utilization efficiency would deteriorate.

On the contrary, in the present exemplary embodiment, the second total reflection surface 14*g* (the first reflection region 14*g*$_R$ and the second reflection region 14*g*$_L$) can be adjusted at an angle such that the rays of light Ray2 totally reflected by the first inner end surface 14*e*1$_R$, the first outer end surface 14*e*2$_R$, the second inner end surface 14*e*1$_L$, and the second outer end surface 14*e*2$_L$ are prevented from impinging on and being reflected by the rear surface 14*c* of the lens body 14, but can directly exit through the first end surface 14*d* as substantially parallel rays of light with respect to the optical axis AX2.

Figure 9:
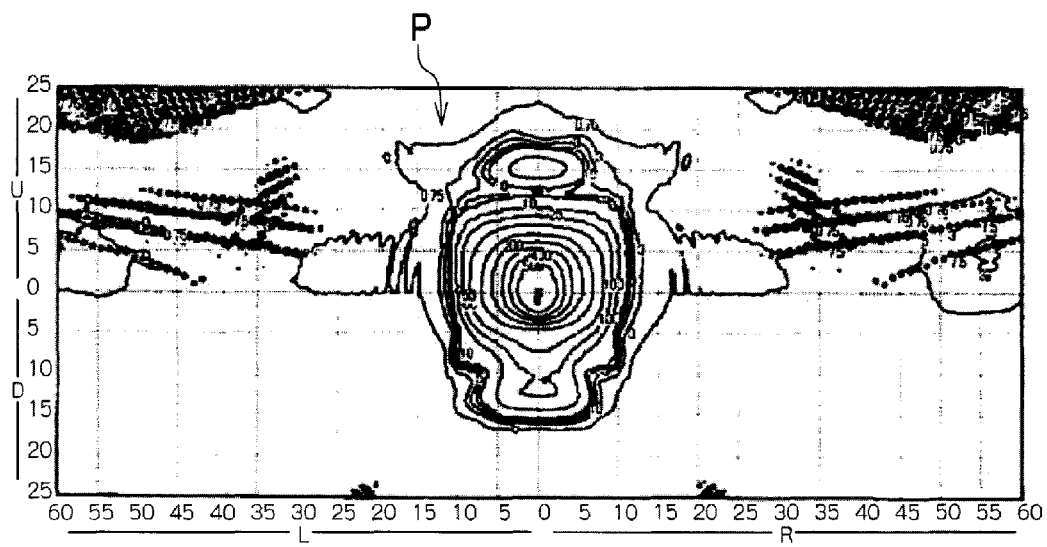
FIG. 9 is a diagram illustrating a light distribution formed by the rays of light projected from the lighting unit of FIG. 4.
Figure 10:
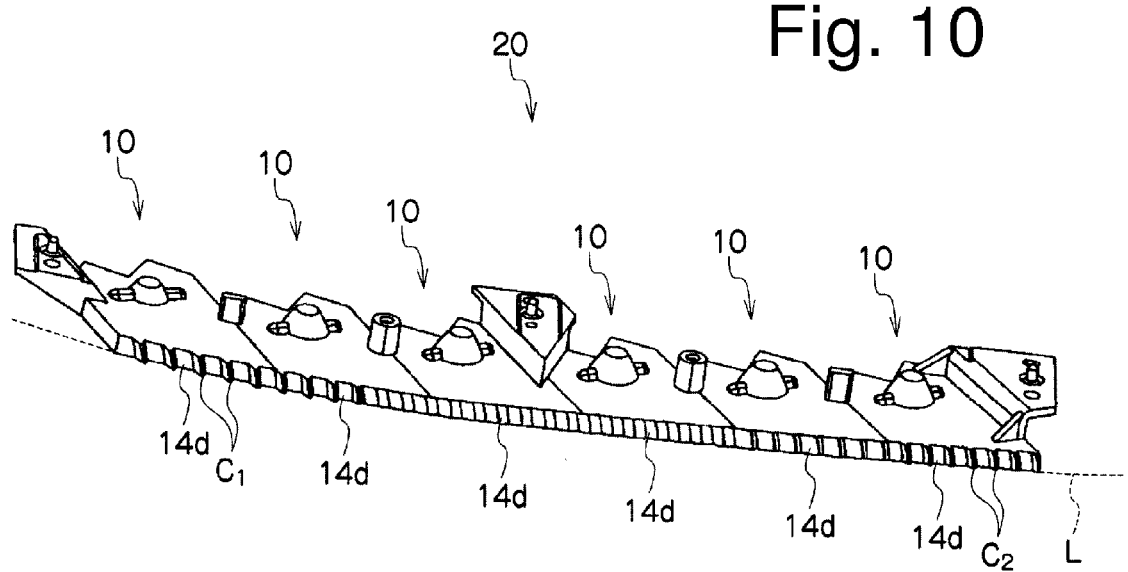
FIG. 10 is a perspective view of a vehicle lighting unit constituting a plurality of the lighting units of FIG. 4.

With this configuration, the rays of light Ray2 totally reflected by the first inner end surface 14*e*1$_R$, the first outer end surface 14*e*2$_R$, the second inner end surface 14*e*1$_L$, and the second outer end surface 14*e*2$_L$ are prevented from being internally reflected by the rear surface 14*c* of the lens body 14, but can travel and directly exit through the first end surface 14*d*. Accordingly, the rays of light can be projected to an area where a certain luminance is required in the light distribution pattern, for example, for a daytime running lamp (see FIG. 5). Accordingly, a light distribution pattern P with high luminance for a daytime running lamp can be achieved (see FIG. 9), whereby the lighting unit 10 can provide a high luminous flux utilization efficiency.

When the angle of the second total reflection surface 14*g* (the first reflection region 14*g*$_R$ and the second reflection region 14*g*$_L$) is adjusted, part of the rays of light Ray2 totally reflected by the first inner end surface 14*e*1$_R$, the first outer end surface 14*e*2$_R$, the second inner end surface 14*e*1$_L$, and the second outer end surface 14*e*2$_L$ may exit through the front surface 14*b* in some cases. In order to prevent the rays of light Ray2 from exiting through the front surface 14*b*, in the present exemplary embodiment the second total reflection surface 14*g* may be shifted toward the rear surface 14*c* as shown in FIG. 5.

As described above, the present exemplary embodiment can be configured such that, as shown in FIG. 6A, the rays of light Ray1 impinging on the first total reflection surface 14*f* can be directly totally reflected by the first total reflection surface 14*f* to the central region 14*d*1 of the first end surface 14*d* and can exit through the central region 14*d*1. Namely, there is no need to form a through hole(s) which has been provided to the conventional lighting unit. By eliminating the unnecessary portion for forming the through hole, the width dimension of the lens body 14 can be reduced.

In addition, according to the present exemplary embodiment the first end edge 14*f*1 of the first total reflection surface 14*f* can extend substantially to a line parallel to the optical axis AX2 and extending from a boundary between the first inner end surface 14*e*1$_R$ and the first outer end surface 14*e*2$_R$ (near an apex B1 of the triangle in FIG. 6A). The second end edge 14*f*2 of the first total reflection surface 14*f* can extend substantially to a line parallel to the optical axis AX2 and extending from a boundary between the second inner end surface 14*e*1$_L$ and the second outer end surface 14*e*2$_L$ (near an apex B2 of the triangle in FIG. 6A). Accordingly, the total reflection surface can be configured to have a larger width than the width of the conventional lighting unit. Accordingly, it is possible to configure a lighting unit 10 that can achieve the luminous flux utilization efficiency equal to or more than the conventional lighting unit (for example, having a width of approx. 60 mm) even with the reduced width of the lens body 14 (for example, having a width of approx. 40 mm).

According to the present exemplary embodiment, while the luminous flux utilization efficiency equal to or more than that of the conventional lighting unit can be achieved, the width dimension of the lens body 14 can be reduced more than the conventional lighting unit. Accordingly, it is possible to provide a compact lighting unit 10 with improved freedom of layout due to the reduced width compared with the conventional lighting unit.

Next, a description will be given of a vehicle lighting unit 20 constituting a plurality of the lighting units 10 with the above configuration with reference to the accompanying drawings.

As shown in FIGS. 10, 11 and 12A to 12C, the vehicle lighting unit 20 can be configured to include a plurality of the lighting units 10 arranged side by side along the area of the front portion to the side portion of a vehicle body (not shown).

The respective first end surfaces 14*d* of the plurality of lighting units 10 can be arranged adjacent to each other along the line L extending from the front portion to the side portion of a vehicle body, so that the first end surfaces 14*d* can form a continuous linear light exiting surface as a whole from the front portion to the side portion of the vehicle body.

At least one of the first end surfaces 14*d* of the plurality of lighting units 10 arranged near the side portion of the vehicle body can have a first lens cut C$_1$ for illuminating a first region in a first direction (for example, in a direction of 45 degrees with respect to the vehicle travelling direction, see FIG. 12B) with the rays of light exiting through that first end surface 14*d* (for example, within the area A shown in FIG. 12A). On the other hand, at least one of the first end surfaces 14*d* of the plurality of lighting units 10 arranged near the front portion of the vehicle body can have a second lens cut C$_2$ for illuminating a second region in a second direction (for example, in a direction of 80 degrees with respect to the vehicle travelling direction, see FIG. 12C) with the rays of light exiting through that first end surface 14*d* (for example, within the area C shown in FIG. 12A).

In the vehicle lighting unit 20 with the above configuration, the action of the first lens cut C$_1$ and that of the second lens cut C$_2$ can provide appropriate light illumination in the first direction (for example, inner 45 degrees with respect to the vehicle travelling direction) and in the second direction (for example, outer 80 degrees with respect to the vehicle travelling direction) where a certain luminance is required as a positioning lamp.

Furthermore, the vehicle lighting unit 20 can form a light distribution pattern P (see FIG. 9) for a daytime running lamp achieved by the rays of light exiting through the first end surfaces 14d within the range B shown in FIG. 12A.

Next, a description will be given of another example of a vehicle lighting unit 30 including a plurality of the lighting units 10 with the above configuration with reference to the drawings.

Figure 13:
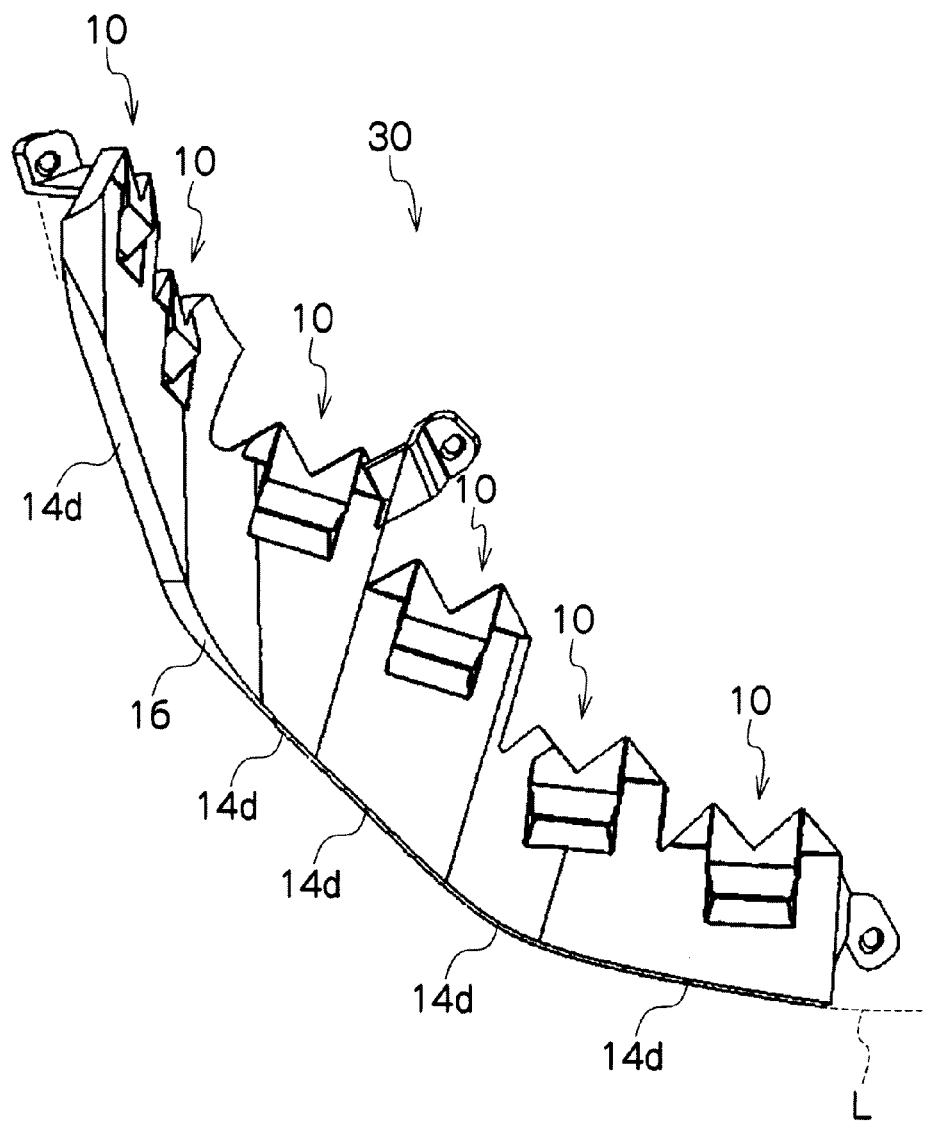
FIG. 13 is a perspective view illustrating another exemplary embodiment of the vehicle lighting unit constituting a plurality of the lighting units of FIG. 4.
Figure 14A:
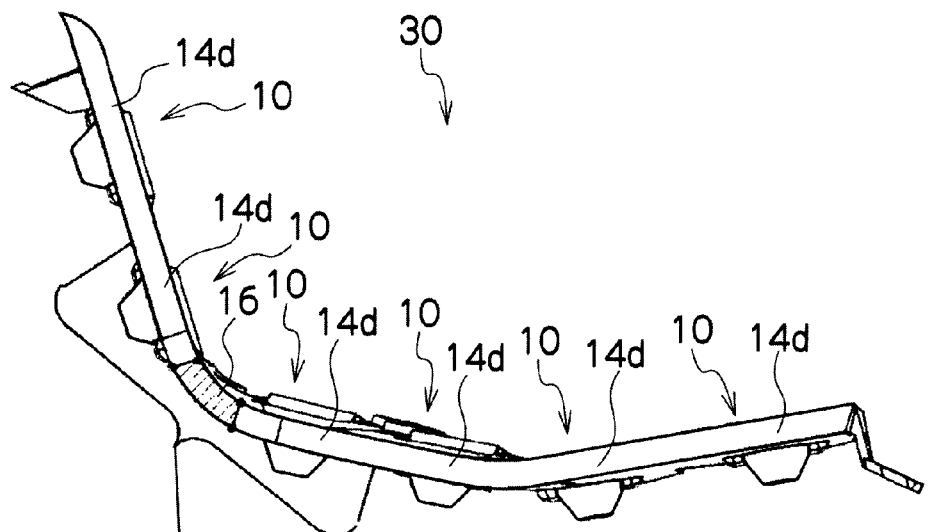
FIG. 14A is a front view of the vehicle lighting unit of FIG. 13.

As shown in FIGS. 13 and 14A, the vehicle lighting unit 30 can include a plurality of lighting units 10 arranged side by side and at least one connection portion 16 that can be interposed between any two adjacent ones of the plurality of lighting units 10 within the range extending from the front portion of the vehicle body to the side portion of the vehicle body.

Namely, the at least one connection portion 16 can be interposed between any two adjacent ones of the first end surfaces 14d of the plurality of lighting units 10 arranged side by side along the line L extending from the front portion to the side portion so that a continuous linear light exiting surface from the front portion of the vehicle body to the side portion can be configured. The connection portion can be formed by injection molding of a transparent resin material such as an acrylic resin or a polycarbonate resin.

Figure 14B:
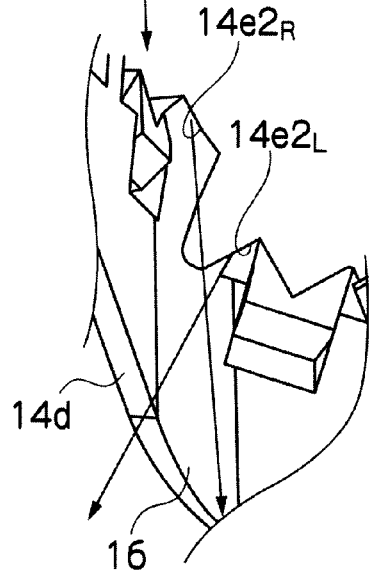
FIG. 14B is an enlarged view illustrating a connection portion and surroundings.

In the present exemplary embodiment, at least one second end surface 14e out of the second end surfaces 14e of the plurality of lighting units 10 can be adjusted so that at least part of the rays of light totally reflected by the second end surface 14e can pass through the connection portion 16. FIG. 14B shows an example in which the first outer end surface $14e2_R$ of the lighting unit 10 that is arranged adjacent to the connection portion 16 on one side (left side in FIG. 14B) and the second outer end surface $14e2_L$ of the lighting unit 10 that is arranged adjacent to the connection portion 16 on the other side (right side in FIG. 14B) are to be adjusted to guide the rays of light to the connection portion 16.

With this configuration, the part of the rays of light totally reflected by the adjusted second end surface 14e (for example, the adjusted first outer end surface $14e2_R$ and the second outer end surface $14e2_L$) can pass through the connection portion 16 so that the connection portion 16 can project the rays of light (can be observed as if it shines). Accordingly, the first end surfaces 14d and the connection portion 16 continuously arranged can project the rays of light without disconnection as a single linear vehicle lighting unit.

Next, modifications will be described.

The present exemplary embodiments have been described with reference to examples such as a daytime running lamp or a position lamp, but the presently disclosed subject matter is not limited to the particular embodiments and/or examples. For example, the presently disclosed subject matter can be applied to a vehicle-mounted signal lamp including a rear position lamp, a stop lamp, a turn signal lamp, and the like while it can be applied to a general purpose illumination device.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting unit, comprising:
an LED light source having an optical axis; and
a lens body disposed in front of the LED light source so that light emitted from the LED light source is incident thereon during operation, the lens body including a lens portion configured to receive the light from the LED light source to collect the light, a first surface including the lens portion, a second surface opposite to the first surface, a first end surface configured to function as a light exiting surface and having a substantially rectangular shape greater in width than in thickness, and a second end surface opposite to the first end surface, wherein:
the lens body includes
a first total reflection surface disposed between the optical axis of the LED light source and the first end surface so as to receive part of the light that has entered the lens body from the lens portion and travels between the optical axis of the LED light source and the first end surface, and
a second total reflection surface disposed between the optical axis of the LED light source and the second end surface so as to receive part of the light that has entered the lens body from the lens portion and travels between the optical axis of the LED light source and the second end surface, the second total reflection surface including a first reflection region disposed on a first side with respect to an optical axis of the lighting unit and a second reflection region disposed on a second side with respect to the optical axis of the lighting unit;
the first total reflection surface is a total reflection surface configured to totally reflect part of the light, which has entered the lens body from the lens portion and impinges on the first total reflection surface, to a central region of the first end surface so that the light exits as rays of light substantially parallel to the optical axis of the lighting unit through the central region;
the second total reflection surface is a total reflection surface configured to totally reflect part of the light, which has entered the lens body from the lens portion and impinges on the second total reflection surface, to the second end surface;
the second end surface includes a first inner end surface disposed on the first side with respect to an optical axis of the lighting unit and a first outer end surface disposed on the outer side of the first inner end surface, and a second inner end surface disposed on the second side with respect to the optical axis of the lighting unit and a second outer end surface disposed on the outer side of the second inner end surface;
the first inner end surface is a total reflection surface configured to totally reflect the light from the first reflection region to the first outer end surface;
the first outer end surface is a total reflection surface configured to directly totally reflect the light from the first inner end surface to a first adjacent region adjacent to the central region of the first end surface on the first side so that the light exits as rays of light substantially parallel to the optical axis of the lighting unit through the first adjacent region;

the second inner end surface is a total reflection surface configured to totally reflect the light from the second reflection region to the second outer end surface;

the second outer end surface is a total reflection surface configured to directly totally reflect the light from the second inner end surface to a second adjacent region adjacent to the central region of the first end surface on the second side so that the light exits as rays of light substantially parallel to the optical axis of the lighting unit through the second adjacent region;

the first total reflection surface includes a first end edge and a second end edge opposite to the first end edge in a width direction of the lens body, which is perpendicular to the optical axis of the lighting unit, the first end edge extending substantially to a line parallel to the optical axis of the lighting unit and extending from a boundary between the first inner end surface and the first outer end surface, the second end edge extending substantially to a line parallel to the optical axis of the lighting unit and extending from a boundary between the second inner end surface and the second outer end surface.

2. The lighting unit according to claim 1, wherein:
the first inner end surface, the first outer end surface, the second inner end surface, and the second outer end surface are inclined according to a draft angle of a mold for use in injection molding of the lens body; and
the first reflection region and the second reflection region are configured such that light that is totally reflected by the first inner end surface and the first outer end surface and light that is totally reflected by the second inner end surface and the second outer end surface cannot be reflected by the second surface of the lens body, but directly exits through the first end surface.

3. The lighting unit according to claim 1, wherein the first end surface is provided with a lens cut for illuminating a desired area in a desired direction with the light exiting through the first end surface.

4. A vehicle light unit comprising:
a plurality of lighting units, each of the plurality of lighting units including:
  an LED light source having an optical axis; and
  a lens body disposed in front of the LED light source so that light emitted from the LED light source is incident thereon, the lens body including a lens portion configured to receive the light from the LED light source to collect the light, a first surface including the lens portion, a second surface opposite to the first surface, a first end surface functioning as a light exiting surface having a substantially rectangular shape greater in width than in thickness, and a second end surface opposite to the first end surface, wherein
the lens body includes,
  a first total reflection surface disposed between the optical axis of the LED light source and the first end surface so as to receive light that has entered the lens body from the lens portion and travels between the optical axis of the LED light source and the first end surface, and
  a second total reflection surface disposed between the optical axis of the LED light source and the second end surface so as to receive light that has entered the lens body from the lens portion and travels between the optical axis of the LED light source and the second end surface, the second total reflection surface including a first reflection region disposed on a first side with respect to an optical axis of the lighting unit and a second reflection region disposed on a second side with respect to the optical axis, the first total reflection surface is a total reflection surface that can directly totally reflect part of the light, which has entered the lens body from the lens portion and impinges on the first total reflection surface, to a central region of the first end surface so that the part of the light exits as rays of light substantially parallel to the optical axis of the lighting unit through the central region, the second total reflection surface is a total reflection surface that can totally reflect part of the light, which has entered the lens body from the lens portion and impinges on the second total reflection surface, to the second end surface, the second end surface is configured to include a first inner end surface disposed on the first side with respect to an optical axis of the lighting unit and a first outer end surface disposed on the outer side of the first inner end surface, and a second inner end surface disposed on the second side with respect to the optical axis of the lighting unit and a second outer end surface disposed on the outer side of the second inner end surface, the first inner end surface is a total reflection surface configured to totally reflect the light from the first reflection region to the first outer end surface, the first outer end surface is a total reflection surface configured to directly totally reflect the light from the first inner end surface to a first adjacent region adjacent to the central region of the first end surface on the first side so that the light exits as rays of light substantially parallel to the optical axis of the lighting unit through the first adjacent region, the second inner end surface is a total reflection surface configured to totally reflect the light from the second reflection region to the second outer end surface, the second outer end surface is a total reflection surface so as to directly totally reflect the light from the second inner end surface to a second adjacent region adjacent to the central region of the first end surface on the second side so that the light exits as rays of light substantially parallel to the optical axis of the lighting unit through the second adjacent region, the first total reflection surface includes a first end edge and a second end edge opposite to the first end edge in a width direction of the lens body, which is perpendicular to an optical axis of the lighting unit, the first end edge extending substantially to a line parallel to the optical axis of the lighting unit and extending from a boundary between the first inner end surface and the first outer end surface, the second end edge extending substantially to a line parallel to the optical axis of the lighting unit and extending from a boundary between the second inner end surface and the second outer end surface, the first end surface includes a lens cut for illuminating a desired area in a desired direction with the light exiting through the first end surface, the first end surfaces of the plurality of lighting units are arranged side by side along a line extending from a front portion of a vehicle body to a side portion of the vehicle body, to provide a continuous linear light exiting surface from the front portion of the vehicle body to the side portion.

5. The vehicle lighting unit according to claim 4, wherein:
at least one of the first end surfaces of the plurality of lighting units arranged near the side portion of the vehicle body has a first lens cut for illuminating a first region in a first direction with light exiting through that first end surface; and
at least one of the first end surfaces of the plurality of lighting units arranged near the front portion of the vehicle body has a second lens cut for illuminating a second region in a second direction with the light exiting through the at least one of the first end surfaces.

6. The vehicle lighting unit according to claim 4, wherein at least one connection portion is interposed between any two adjacent ones of the first end surfaces of the plurality of lighting units arranged side by side along the line extending from the front portion of the vehicle body to the side portion of the vehicle body to form a continuous linear light exiting surface from the front portion of the vehicle body to the side portion; and
at least one second end surface out of the second end surfaces of the plurality of lighting units is configured so that at least part of the light totally reflected by the second end surface passes through the connection portion.

7. The vehicle lighting unit according to claim 5, wherein at least one connection portion is interposed between any two adjacent ones of the first end surfaces of the plurality of lighting units arranged side by side along the line extending from the front portion of the vehicle body to the side portion of the vehicle body to form a continuous linear light exiting surface from the front portion of the vehicle body to the side portion; and
at least one second end surface out of the second end surfaces of the plurality of lighting units is configured so that at least part of the light totally reflected by the second end surface passes through the connection portion.

* * * * *